United States Patent [19]

Smets

[11] Patent Number: 4,462,746

[45] Date of Patent: Jul. 31, 1984

[54] PALLET HANDLING APPARATUS AND METHOD

[75] Inventor: John S. Smets, Lake Oswego, Oreg.

[73] Assignee: Smetco, Inc., Portland, Oreg.

[21] Appl. No.: 443,622

[22] Filed: Nov. 22, 1982

[51] Int. Cl.³ ............................................. B65G 59/02
[52] U.S. Cl. .................................. 414/330; 414/112; 414/786
[58] Field of Search .................. 198/412, 409; 414/38, 414/112, 117, 330, 786

[56] References Cited

U.S. PATENT DOCUMENTS

| | | | |
|---|---|---|---|
| 3,521,763 | 7/1970 | Heide et al. | 414/330 X |
| 4,022,332 | 5/1977 | Freakes et al. | 414/330 X |
| 4,037,734 | 7/1977 | Erdman | 414/330 |
| 4,178,122 | 12/1979 | Abrahamson | 198/409 X |
| 4,249,847 | 2/1981 | Tokuno | 414/330 |

FOREIGN PATENT DOCUMENTS 53-22260  3/1978  Japan .................................. 414/330

OTHER PUBLICATIONS

Smetco brochure, "A New Complete Pallet Repair System", Mar. 5, 1975.

Primary Examiner—Robert J. Spar
Assistant Examiner—Ken Muncy
Attorney, Agent, or Firm—Klarquist, Sparkman, Campbell, Leigh & Whinston

[57] ABSTRACT

An apparatus for handling pallets is provided. The apparatus includes a tiltable pallet stack receiver for receiving an upright stack of pallets at a pallet stack station and for tilting the stack downwardly to a generally horizontal position, a mechanism for laterally displacing the stack from a position in endwise alignment with the pallet stack station to one in endwise alignment with a pallet sorting station which is laterally offset from the pallet stack station, and a pallet indexer for displacing the horizontally disposed stack in an endwise direction toward the pallet sorting station as pallets are removed from an end of the stack. The invention thus provides a pallet sorting capability which is faster and involves less manual labor than necessary with conventional sorting systems.

13 Claims, 6 Drawing Figures

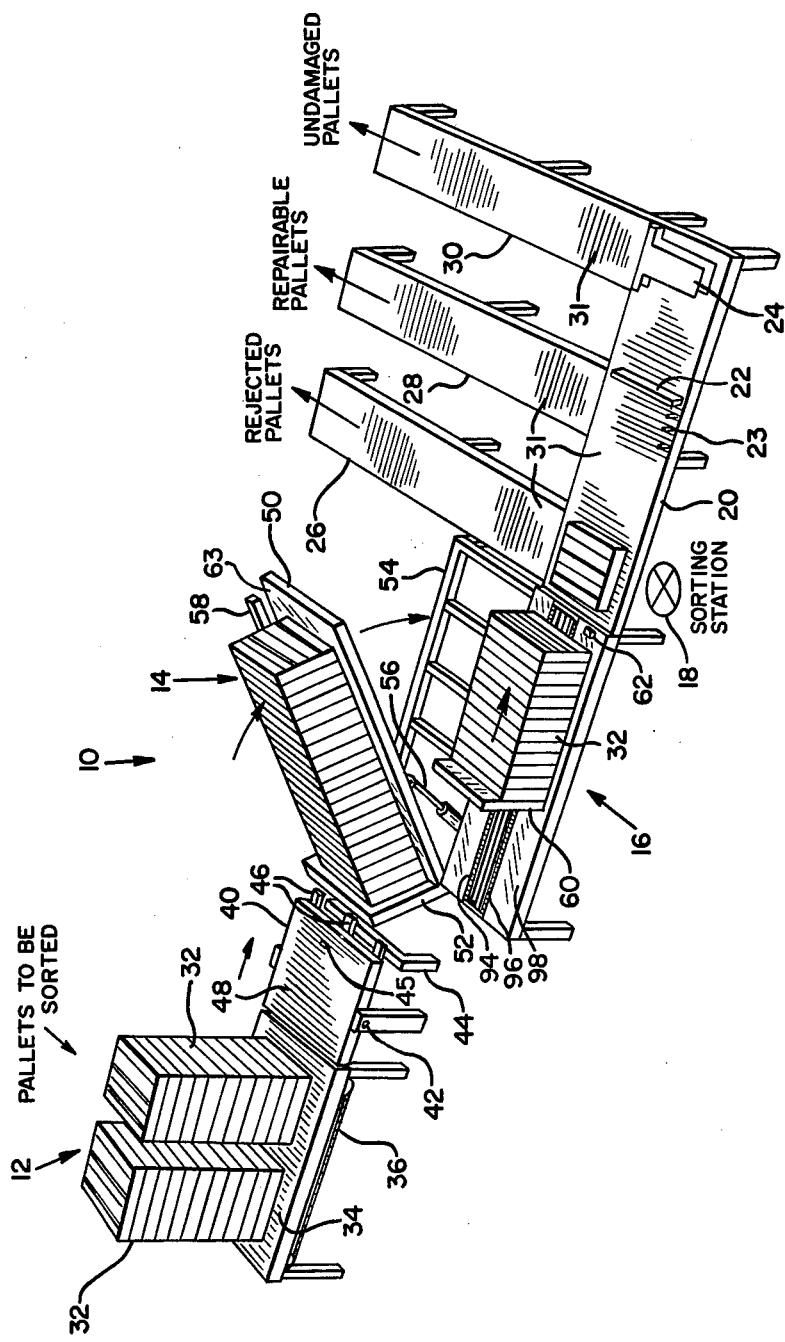
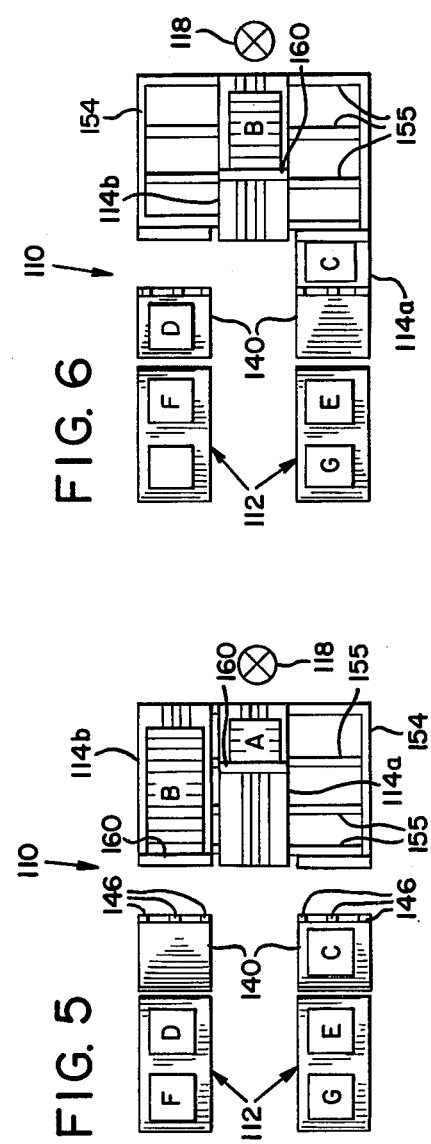

PALLET HANDLING APPARATUS AND METHOD

BACKGROUND OF THE INVENTION

1. Field of the Invention

This invention relates generally to an apparatus and method for handling a stack of pallets.

2. Discussion of the Prior Art

Pallets have been used for many years in connection with the storing, shipment, and handling of goods. Pallets are normally constructed of wood and are subject to damage because of the rough handling they receive. Therefore it is necessary periodically to inspect pallets so that damaged pallets can be segregated for repair or disposal.

Various systems have been developed to automate pallet sorting operations and therefore keep sorting time to a minimum. Such automated sorting operations often utilize a so-called "up-ender" which comprises a substantially L-shaped member which is tiltable from a position in which the long side of the member is upright to one in which the long side is horizontally disposed. An upright stack of pallets to be sorted is received by the up-ender when it is in its upright position; that is, with the long side extending vertically. The up-ender is then tilted downwardly to a horizontal position so that the pallets can be individually removed from the end of the stack and sorted into acceptable, repairable, and nonrepairable pallet groups.

While the use of up-enders has tended to reduce pallet sorting time and to keep man power requirements to a minimum, a substantial amount of physical effort is still required by pallet sorting personnel. For example, as the sorter removes individual pallets from the stack of pallets on the up-ender, he is forced manually to slide the pallets along the up-ender. When near the bottom of the stack, this might require the worker to slide the pallet as far as 15 feet from one end of the up-ender to the other. This is not only time consuming but requires substantial physical exertion by the worker.

Another drawback with operations using a conventional up-ender is that once the horizontally disposed up-ender has been emptied of pallets, the up-ender must be tilted to its upright position to receive the next stack of pallets. The up-ender is then tilted downwardly to its horizontal position. This upward tilting, pallet stack loading, and downward tilting typically takes around one minute and thirty seconds. During this time, the operator is typically standing by, doing nothing. Because it normally takes only about two minutes to actually sort all of the pallets in a stack, by adding an extra minute and a half, the handling time for each stack is increased by about seventy-five percent.

Hence, it is a primary object of the present invention to provide an improved apparatus and method for handling pallets which effectively and reliably overcome the aforementioned drawbacks and limitations of the prior art proposals. More specifically, a primary object of the present invention is to reduce the amount of physical labor required during pallet sorting operations. Another object is to reduce the time expended by the worker in individually removing pallets from a horizontally disposed up-ender. Yet another object is to reduce the time delay in sorting operations caused by the upward and downward tilting of the up-ender. A further object of the invention is to provide an apparatus and method which achieves the above objects without substantially increasing the complexity and therefore the expense and maintenance requirements of pallet handling equipment, and which permits existing equipment to be retrofitted to include the features of the invention.

SUMMARY OF THE INVENTION

This invention responds to the problems presented in the prior art by providing an apparatus and method for handling pallets which includes the following components: tiltable pallet stack receiving means for receiving an upright stack of pallets at a pallet stack station and for tilting the stack downwardly to a generally horizontal position; means for laterally displacing the stack from a position in endwise alignment with the pallet stack station to a position in endwise alignment with a pallet sorting station which is laterally offset from the pallet stack station; and pallet indexing means for displacing the horizontally disposed stack in an endwise direction toward the pallet sorting station as pallets are removed from an end of the stack. To be in "endwise alignment" means that if a pallet stack is disposed horizontally, a position in endwise alignment with the stack will be intersected by an extension of a longitudinal axis passing through the stack. The term "laterally offset" refers to a position which is not in endwise alignment but rather is offset to one side.

Thus, because the stack is being automatically indexed toward the sorting station as pallets are removed from the pallet indexing means, the worker does not have to slide individual pallets from one end of the up-ender to the other as he had to in the past. Also, the pallet stack receiving means can be tilted upwardly to receive another stack and then downwardly to a horizontal position, all while the worker is removing and sorting pallets from the index means. Thus, both the amount of physical labor exerted by the worker, and the time required for sorting are substantially reduced.

In one embodiment, the means for laterally displacing the stack comprises a bar which extends along a long side of the pallet stack receiving means and which is adapted to push the stack laterally across the pallet stack receiving means and onto the pallet indexing means. In a second embodiment, the means for laterally displacing the stack involves laterally displacing the entire up-ender. In this latter embodiment, a second up-ender is used to receive and lower the next stack of pallets. Thus, the time spent is even further reduced because the operator will not have to wait while the indexing means is returned to the rearward end of the pallet indexing means in preparation to receive the next stack from the pallet stack receiving means.

BRIEF DESCRIPTION OF THE DRAWINGS

The invention will be better understood and objects and advantages other than those set forth above will become apparent when consideration is given to the following detailed description thereof. Such description makes reference to the annexed drawings wherein:

FIG. 1 is a schematic view of a pallet sorting system using a first embodiment of the present invention;

FIG. 5 is a schematic view of a second embodiment of the present invention showing pallets from stack A being fed to the pallet sorting station; and FIG. 6 is another schematic view of the second embodiment showing pallets from stack B being fed to the pallet sorting station.

THE SORTING SYSTEM OF THE FIRST EMBODIMENT

Figure 4:
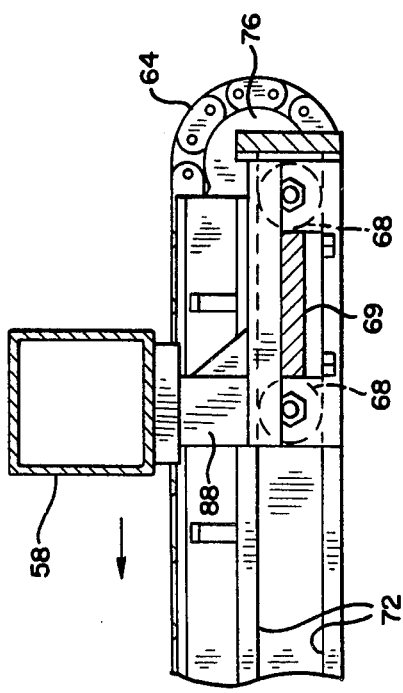
FIG. 4 is a sectional view taken along line 4—4 of FIG. 2.

The principles of this invention are particularly useful when embodied in a pallet sorting system such as that schematically illustrated in FIG. 1, generally identified with the numeral 10. The sorting system is comprised essentially of a pallet stack station 12, a pallet stack up-ender 14, a pallet indexer 16, a pallet sorting station 18, a sorting conveyor 20 having a remotely controlled sorting gate 22, a pop-up conveyor 23, and a pallet turner 24 thereon. Also included are a rejected pallet conveyor 26, a repairable pallet conveyor 28, and an undamaged pallet conveyor 30. Each of the conveyors 20, 26, 28, and 30 has freewheeling rollers 31 thereon so that pallets will freely glide along the conveyors when pushed by the operator.

A single worker stands at the sorting station 18 and individually removes pallets from a stack 32 of pallets being forwardly indexed by the indexer 16. Those pallets which are not in repairable condition are sent to a rejected pallets stack (not shown) at the end of the rejected pallet conveyor 26. Those pallets which are damaged but repairable are pushed along the sorting conveyor 20 but are stopped by the sorting gate 22 which is raised by the operator by remote control to stop the repairable pallet, at which point the pop-up conveyor 23 engages the pallet and pushes it onto the repairable pallet conveyor 28. The pop-up conveyor 23 is conventional in design and includes a plurality of driven members which, when the pop-up conveyor is raised, engage the pallet and convey it onto the repairable pallet conveyor 28. The pop-up conveyor 23 and the sorting gate 22 are automatically lowered when the repairable pallet contacts a limit switch (not shown) disposed part way down the repairable pallet conveyor 28. When the operator finds an undamaged pallet which he wants to send along the undamaged pallet conveyor 30, the pallet is directed down to the end of the sorting conveyor 20 at which point the pallet turner 24 turns the pallet by flipping it over and sending it onto the undamaged pallet conveyor 30. The pallet turner 24 is also conventional in design and includes a pair of pivotal, spaced extension members, between which the pallet to be turned is disposed prior to being engaged and flipped over onto the undamaged pallet conveyor 30. A limit switch (not shown) is disposed at the end of the sorting conveyor 20. When this limit switch is contacted by a pallet, the pallet turner 24 is automatically pivoted to flip the pallet onto the undamaged pallet conveyor 30.

Pallet stack station 12 retains a plurality of pallet stacks 32 in position for transfer to the up-ender 14. The upstream or leftmost portion of the pallet stack station 12, as depicted in FIG. 1, includes a plurality of rollers 34 which are driven by suitable roller drive means 36 so that the stacks 32 can be selectively driven in a rightward direction or toward the up-ender 14.

The rightmost end of the pallet stack station 12 includes a tilt table 40 with freewheeling rollers 48 disposed thereon. A photoelectric eye 45 is disposed adjacent the downstream end of the tilt table 40 to sense the presence of a stack on the tilt table, for reasons to be discussed below. The tilt table 40 is pivotable on a pivot 42 between the depicted horizontal position and that in which the underside of the rightmost or downstream edge of the table rests on a pair of abutment legs 44. The purpose of the tilt table 40 is to cause a pallet disposed thereon to glide downwardly onto the up-ender 14 at the appropriate time. As will be discussed further below, the tilt table 40 is caused to tilt when the up-ender 14 pushes downwardly on a plurality of spaced tabs 46, causing the stack (not shown) disposed on the tilt table to roll onto the up-ender 14.

CONSTRUCTION OF THE FIRST EMBODIMENT

The up-ender 14 includes a long portion 50 and a short portion 52, which are joined at right angles to form a substantially L-shaped structure. The up-ender 14 is pivotally mounted to an up-ender frame 54, the pivotal position of the up-ender being controlled by a pair of hydraulic cylinders 56, only one of which shows in FIG. 1. A photoelectric eye (not shown) is provided below the long portion 50 of the up-ender 14 to sense the presence of a stack thereon. The up-ender 14 also includes a stack displacement bar 58 which is adapted to laterally to displace a pallet stack 32 from the horizontally disposed up-ender 14 onto the indexer 16, when an indexing plate 60 of the indexer is indexed back to its starting or leftmost position.

A limit switch 61 determines when a pallet stack 32 has been transferred from the up-ender 14 onto the indexer 16. As the operator begins individually to remove pallets from the stack 32, a photoelectric eye 62 senses the absence of the pallet and automatically causes indexing plate 60 to index forwardly or rightwardly as shown in FIG. 1, until another pallet is disposed over the electric eye. Once this pallet is removed by the operator, the indexing operation is repeated until all of the pallets have been removed from the indexer 16. As the operator sorts the pallets into rejected, repairable, and undamaged stacks, he sends them along the rejected pallet conveyor 26, the repairable pallet conveyor 28 using sorting gate 22 and pop-up conveyor 23, or the undamaged pallet conveyor 30 using the pallet turner 24.

Figure 2:
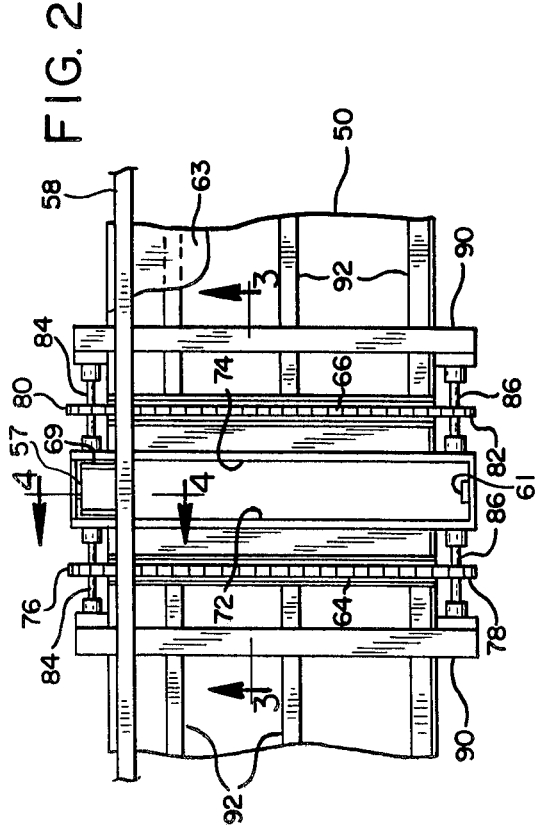
FIG. 2 is a partially cut away, fragmentary plan view of a long side of the up-ender of the first embodiment showing the means by which a stack displacement bar is driven from one side to the other.
Figure 3:
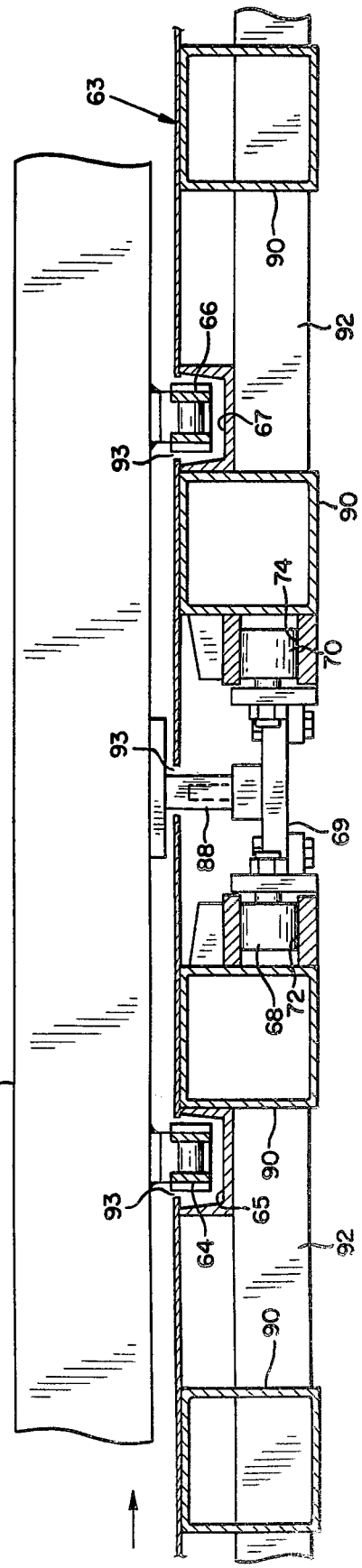
FIG. 3 is a fragmentary sectional view taken along line 3—3 of FIG. 2.

FIGS. 2 through 4 are detailed depictions of the up-ender 14, showing the means by which the stack displacement bar 58 is driven across the long portion 50 of the up-ender 14.

As depicted, the stack displacement bar 58 is driven across the long portion 50 of the up-ender 14 above an up-ender cover plate 63 by a pair of drive chains 64 and 66. The drive chains 64 and 66 are disposed in drive chain channels 65 and 67 which are exposed by slots 93 in the cover plate. Two pairs of aligned guide rollers 68 and 70 are mounted to a guide carriage 69 to guide the stack displacement bar 58 as it moves across the up-ender 14. Each of the pairs of guide rollers 68 and 70 are disposed within a roller guide track 72 and 74. Each of the drive chains 64 and 66 extend between a pair of drive chain sprockets 76 and 78, and 80 and 82. Sprockets 76 and 80, and 78 and 82 are each driven on common sprocket drive shafts 84 and 86, respectively, to ensure that all of the sprockets rotate at the same speed. Sprocket drive shaft 86 is driven by a drive motor (not shown) slung under the long portion 50 of the up-ender 14, thus providing the drive power for the stack displacement bar 58.

As shown best in FIGS. 3 and 4, the weight of the stack displacement bar 58 is borne by the guide rollers 68 and 70 and the roller guide tracks 72 and 74 via a substantially T-shaped bar support 88 which extends upwardly from the cariage 69 through the up-ender cover plate 63. The two pairs of guide rollers 68 and 70 cooperate with the carriage 69 and the bar support 88 to prevent the stack displacement bar 58 from tilting forwardly or rearwardly as it is driving the pallet stack 32 across the up-ender 14.

In the depicted embodiment, the stack displacement bar 58 is shown to be mounted directed above one end of the carriage 69 (see FIG. 4). It is often desirable and normally is preferable to mount the stack displacement bar 58 in such a way that it is cantilevered to the left (FIG. 4) from the depicted position to ensure that the bar has the capability of pushing even smaller sized pallets all the way onto the indexer 16 and to make sure that the trailing edges of the pallets do not get hung up on the up-ender 14.

The structural components of the long portion 50 of the up-ender 14 are best shown in FIG. 3. A plurality of evenly spaced, transverse channels 90 extend between a plurality of evenly spaced longitudinally extending channels 92. As mentioned above, the cover plate 63 extends across the top of the up-ender 14 to provide a smooth surface across which the pallet stack 32 can slide. The cover plate has slots 93 therein through which the drive chains 64 and 66 and the bar support 88 extend.

The structure of the stack displacement means for the indexer 16 is basically the same as that of the up-ender 14. A pair of indexing plate conveyor chains 94 and 96 appear in FIG. 1, but the other drive components do not show in this figure and have not been depicted in detail.

As mentioned above, a photoelectric eye 62 is disposed in one of the forward or downstream corners of the up-ender, which is mounted to appropriate switching means to control the operation of an indexing plate drive motor (not shown) which is slung under the indexer 16 and which drives two sprocket drive shafts in the same fashion as described above with respect to the drive for the stack displacement bar 58.

One structural difference between the up-ender 14 and the indexer 16 is that the indexer cover plate 98 includes inclined segments which permit pallets to slide across the indexer 16 without becoming hung up on slots through which the indexer drive chains 94 and 96 and the indexer support (not shown) extend. This cover plate configuration is not required for the up-ender 14 because the slots 93 provided for the drive chains 64 and 66 and the support 88 extend in the same direction that the pallets are being displaced.

OPERATION OF THE EMBODIMENT OF FIGS. 1 THROUGH 4

To initiate sorting operations, the pallet stacks 32 to be sorted are driven forwardly or rightwardly in FIG. 1 by the roller drive means 36 at the pallet stack station 12 until a stack is disposed on the tilt table 40. The presence of the stack 32 is sensed by the photoelectric eye 45 in the tilt table, which permits the up-ender 14 to be tilted to its upright position. The underside of the short portion 52 thereof contacts the tabs 46 extending from the edge of the tilt table 40, causing the tilt table to pivot in a clockwise direction as depicted in FIG. 1 until the underside of the rightmost edge of the tilt table contacts the abutment legs 44. This causes the stack 32 to roll down rollers 48 onto the up-ender 14. The presence of the stack 32 on the up-ender 14 is sensed by the up-ender photoelectric eye (not shown).

When a stack 32 is in position on the up-ender 14, the up-ender is tilted downwardly by the hydraulic cylinders 56 until the long portion 50 thereof is substantially horizontal. When the indexer 16 has been cleared of pallets and the indexing plate 60 has been returned to its original position alongside the short portion 52 of the up-ender, a limit switch disposed adjacent that end of the indexer 16 actuates the stack displacement bar motor (not shown) which drives the sprocket drive shafts 84 and 86 and thereby causes the drive chains 64 and 66 to draw the stack displacement bar 58 across the long portion 50 of the up-ender 14. This pushes the stack 32 edgewise onto the indexer 16. As the stack is being pushed across the indexer 16, the indexer cover plate 98 slidably elevates the leading edges of the pallets to prevent them from being hung up in the slots through which the indexer drive chains 94 and 96 and the indexer support extend.

When the stack displacement bar 58 has laterally displaced the pallet stack 32 onto the indexer 16, limit switch 61, sensing the position of stack displacement bar 58, starts the indexing plate drive motor (not shown) which causes the indexing plate 60 to index the stack endwise toward the forward end of the indexer 16. When a pallet passes over the photoelectric eye 62, the indexing plate 60 is automatically stopped until that forward pallet is removed by the operator, who directs the pallet onto either the rejected pallet conveyor 26, the repairable pallet conveyor 28 using the sorting gate 22 and the pop-up conveyor 23, or the undamaged pallet conveyor 30 using the pallet turner 24. The index plate then indexes forwardly again until another pallet is disposed over the photoelectric eye 62.

Once a signal is received from limit switch 61, and as the indexing plate 60 is feeding pallets to the operator, the direction of rotation of drive shaft 86 is reversed, causing the stack displacement bar to return to its original position. This original position is sensed by another limit switch 57 adjacent the far side of the up-ender 14. Once the bar is in this position and a positive signal is received from the tilt table photoelectric eye 45 indicating the presence of a stack 32 thereon, the up-ender 14 is elevated by the hydraulic cylinders 56 to its original upright position. The underside of the short portion 52 of the up-ender 14 then contacts the tabs 46 extending from the tilt table 40, and the tilt table is tilted downwardly toward the up-ender, causing the next stack 32 to roll onto the up-ender. The up-ender is then tilted downwardly to its horizontal position. It remains in this position until all the pallets have been removed from the indexer 16 and the indexing plate 60 has returned to its original, leftmost position.

Thus, the one and one-half minute waiting time while the up-ender is tilted upwardly and then downwardly, is eliminated. It takes approximately fifteen seconds for the indexing plate 60 to return to its original position and an additional fifteen seconds for the stack 32 to be pushed over to the indexer by the stack displacement bar 88. Therefore, the net time saved is about one minute, reducing the total time spent sorting a stack from about three and one-half to about two and one-half minutes.

THE EMBODIMENT OF FIGS. 5 AND 6

FIGS. 5 and 6 depict a second embodiment of the present invention which can save even more time during pallet sorting operations. Much of the structure of this second embodiment is similar to that of sorting system 10; so corresponding components have been identified with the same numerals except in the 100 series. Therefore the stacking system of the second embodiment has been generally identified with the numeral 110. Seven stacks of pallets are illustrated in FIGS. 5 and 6, but unlike the first embodiment, have been identified with the letters A, B, C, D, E, F, and G. Two separate pallet stack stations 112 are shown and are spaced from each other by about the width of the up-ender. The pallet stack stations 112 are identical in construction to pallet stack station 12 and include a tilt table 140 with tabs 146 which extend from one edge thereof.

The basic difference between sorting system 110 and sorting system 10 is that two up-enders 114a and 114b are provided, rather than the single up-ender 14 of the first embodiment. The two up-enders 114a and 114b are slidable along a common up-ender frame 154 through suitable chain and roller drive mechanisms similar to that depicted in FIGS. 2 through 4 and discussed above, such mechanisms being indicated schematically at 155. The two up-enders 114a and 114b are designed to be laterally displaced to either direction at the same time, so that complicated drive and control means are not required.

The other basic difference between the up-enders 114a and 114b and up-ender 14 is that up-enders 114a and 114b do not include a stack displacement bar 58 but do include an indexing plate 160. This difference in structure is dictated because in this embodiment a stack is never laterally displaced from its up-ender, but rather the up-ender itself is laterally moved across the up-ender frame 154. Therefore, the features of the up-enders and indexers are combined into a single component.

OPERATION OF THE EMBODIMENT OF FIGS. 5 AND 6

In FIG. 5, stack A is shown in endwise alignment with the sorting station 118. The operator is in the process of individually removing the pallets from stack A and sorting them into rejected, repairable, and undamaged groupings as described above with the system 10. The indexing plate 160 is shown to have indexed most of the pallets in stack A to the sorting station 118. While the pallets of stack A were being indexed to the sorting station, stack B was being transferred from the tilt table 140 and was being tilted downwardly by the up-ender 114, so that as shown in FIG. 5, stack B is now horizontally disposed and resting upon the up-ender frame 154.

When all of the pallets of stack A have been sorted, both of the up-enders 114a and 114b are laterally displaced (downwardly as depicted in FIG. 5) until stack B is in endwise alignment with the sorting station 118, and up-ender 114a is in endwise alignment with stack C disposed on the tilt table 140. The pallets of stack B are indexed toward the sorting station 118 by indexing plate 160 while up-ender 114a is tilted upwardly to receive stack C (as depicted in FIG. 6), and then downwardly to its horizontal position. By the time all of the pallets in stack B have been indexed to the sorting station 118, stack C will be horizontally disposed so that the up-enders 114a and 114b can be laterally displaced (upwardly as depicted in FIG. 5) until stack C is in endwise alignment with the sorting station.

Thus, the only delay during sorting operations with this second embodiment is as the up-enders 114a and 114b are being laterally displaced into alignment with the sorting station 118, which takes about fifteen seconds. However, this second embodiment saves fifteen seconds more than the embodiment of FIGS. 1-4 because the operator does not have to wait for the index plate to go back to its original position and for the stack displacement bar 58 to push the stack across onto the indexer 16, which cumulatively takes thirty seconds. Therefore, this second embodiment reduces per stack sorting time to about two minutes and fifteen seconds.

Of course, it should be understood that various changes and modifications of the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. An apparatus for handling pallets, comprising:
   tiltable pallet stack receiving means for receiving a first upright stack of pallets at a pallet stack station and for tilting the first stack downwardly to a generally horizontal position;
   means for laterally displacing the first stack from a position in endwise alignment with said pallet stack station to one in endwise alignment with a pallet sorting station laterally offset from said pallet stack station; and
   pallet indexing means for displacing the horizontally disposed first stack in an endwise direction toward the pallet sorting station as pallets are removed from an end of the first stack while simultaneously tilting a second stack of pallets downwardly from an upright position at the pallet stack station to a generally horizontal position in preparation for lateral displacement of the second stack to said position in endwise alignment with said pallet sorting station.

2. The apparatus of claim 1 wherein said means for laterally displacing the first stack comprises means for transferring the first stack from said pallet stack receiving means to said pallet indexing means.

3. The apparatus of claim 2 wherein said means for transferring the first stack comprises a longitudinally extending member mounted to said pallet stack receiving means, for engaging and pushing a side edge of each of the pallets.

4. The apparatus of claim 3 wherein said pallet stack receiving means comprises an L-shaped member, and said longitudinally extending member is mounted to a long side of said L-shaped member.

5. The apparatus of claim 4 wherein said pallet indexing means includes a stack support platform and a reciprocable member extending perpendicularly therefrom.

6. The apparatus of claim 1 wherein said means for laterally displacing the first stack comprises means for laterally displacing said pallet stack receiving means from a position in endwise alignment with said pallet stack station to one in endwise alignment with said pallet sorting station.

7. The apparatus of claim 6 wherein said pallet indexing means comprises a reciprocable member mounted adjacent one end of said pallet stack receiving means.

8. A method for handling pallets, comprising:
tilting a first stack of pallets downwardly from an upright position at a pallet stack station to a generally horizontal position;
laterally displacing the first stack from a position in endwise alignment with the pallet stack station to one in endwise alignment with a pallet sorting station which is laterally offset from the pallet stack station;
removing pallets from a first end of the first stack; and
displacing the first stack of pallets endwise toward the first end as pallets are removed therefrom while simultaneously tilting a second stack of pallets downwardly from an upright position at the pallet stack station to a generally horizontal position in preparation for lateral displacement of the second stack to said position in endwise alignment with said pallet sorting station and for subsequent removal of the pallets therefrom.

9. An apparatus for handling pallets, comprising: tiltable pallet stack receiving means for receiving a first upright stack of pallets at a pallet stack station and for tilting the first stack downwardly to a generally horizontal position; means for laterally displacing the first stack from a position in endwise alignment with said pallet stack station to one in endwise alignment with a pallet sorting station laterally offset from said pallet stack station; and pallet indexing means for displacing the horizontally disposed first stack in an endwise direction toward the pallet sorting station as pallets are removed from an end of the first stack while simultaneously tilting a second stack of pallets downwardly from an upright position at the pallet stack station to a generally horizontal position in preparation for lateral displacement of the second stack to said position in endwise alignment with said pallet sorting station and for subsequent removal of the pallets therefrom;
first and second laterally spaced apart tiltable stack receiving means, each for receiving an upright stack of pallets at respective associated first and second pallet stack stations and for tilting the received stack downwardly to a generally horizontal position in endwise alignment with the associated pallet stack station;
means for laterally displacing the first of said pallet stack receiving means from its generally horizontal position in endwise alignment with the first stack station to a pallet discharge position in endwise alignment with a pallet sorting station laterally offset from the first and second stack station; and
second means for laterally displacing the second of said pallet stack receiving means from its generally horizontal position in endwise alignment with the second stack station to a pallet discharge position in endwise alignment with the pallet sorting station at times when the first pallet stack receiving means is not in its pallet discharge position.

10. The apparatus according to claim 9, including means for simultaneously laterally shifting said first and second pallet stack receiving means, with first pallet stack receiving means being shifted to its pallet discharge position while the second pallet stack receiving means is being shifted out of its pallet discharge position, and with the second pallet stack receiving means being shifted to its pallet discharge position while the first pallet stack receiving means is being shifted out of its pallet discharge position.

11. The apparatus according to claim 10 in which said first and second pallet stack receiving means are shifted to a common pallet discharge position.

12. The apparatus according to claim 9 in which a respective indexing means is mounted to each of said pallet stack receiving means.

13. The apparatus according to claim 12 in which each said pallet stack receiving means comprises an L-shaped member, the long side element of said L-shaped member being generally horizontal and the short side element of said L-shaped member being generally vertical when the pallet stack receiving means is in its generally horizontal position, said short side element being slidable along the length of said long side element, said pallet indexing means comprising means for moving said short side member to displace the horizontally disposed stack of pallets in an endwise direction toward the pallet sorting station as pallets are moved from the end of the stack.

* * * * *